(12) United States Patent
Asakawa

(10) Patent No.: US 12,392,981 B2
(45) Date of Patent: Aug. 19, 2025

(54) OPTICAL ELEMENT DRIVING DEVICE, CAMERA DEVICE, AND ELECTRONIC APPARATUS

(71) Applicant: New Shicoh Motor Co., Ltd., Zhejiang (CN)

(72) Inventor: Shinroku Asakawa, Yamato (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 380 days.

(21) Appl. No.: 17/984,777

(22) Filed: Nov. 10, 2022

(65) Prior Publication Data

US 2023/0152551 A1 May 18, 2023

(30) Foreign Application Priority Data

Nov. 16, 2021 (CN) .......................... 202111354743.5

(51) Int. Cl.
| | |
|---|---|
| G02B 7/02 | (2021.01) |
| G01D 5/14 | (2006.01) |
| G02B 3/12 | (2006.01) |
| H02K 11/215 | (2016.01) |
| H02K 41/035 | (2006.01) |
| H04M 1/02 | (2006.01) |
| G03B 30/00 | (2021.01) |

(52) U.S. Cl.
CPC .............. *G02B 7/02* (2013.01); *G01D 5/145* (2013.01); *G02B 3/12* (2013.01); *H02K 11/215* (2016.01); *H02K 41/0354* (2013.01); *H04M 1/0264* (2013.01); *G03B 30/00* (2021.01)

(58) Field of Classification Search
CPC ... G02B 7/02; G02B 3/12; G02B 7/08; G02B 26/004; G02B 3/14; G02B 6/3538; G02B 26/005; G01D 5/145; H02K 11/215; H02K 41/0354; H04M 1/0264; G03B 30/00; G03B 3/10; G03B 5/00
See application file for complete search history.

(56) References Cited

U.S. PATENT DOCUMENTS

| | | | |
|---|---|---|---|
| 5,825,545 | A | 10/1998 | Kino et al. |
| 2005/0152049 | A1 | 7/2005 | Juhala |

(Continued)

FOREIGN PATENT DOCUMENTS

| | | |
|---|---|---|
| CN | 101473642 A | 7/2009 |
| CN | 113243102 A | 8/2021 |

(Continued)

OTHER PUBLICATIONS

Machine translation of WO 2022/045702 A1 (Year: 2022).*

*Primary Examiner* — Pinping Sun
*Assistant Examiner* — Matthew Y Lee
(74) *Attorney, Agent, or Firm* — Hayes Soloway PC

(57) ABSTRACT

An optical element driving device includes: a fixed portion; an optical element in which liquid is encapsulated between a first end surface and a second end surface opposite to each other and the first end surface is fixed to the fixed portion; a first movable portion supported by the fixed portion and rotatable around an axis of a first rotation shaft; and a second movable portion supported by the first movable portion, rotatable around an axis of a second rotation shaft orthogonal to the first rotation shaft, and fixing the second end surface.

12 Claims, 4 Drawing Sheets

(56) References Cited

U.S. PATENT DOCUMENTS

| | | | | |
|---|---|---|---|---|
| 2009/0002825 A1* | 1/2009 | Morita | .................... | G03B 5/00 |
| | | | | 359/554 |
| 2020/0012068 A1* | 1/2020 | Lim | .................... | H05K 1/181 |
| 2020/0355910 A1 | 11/2020 | Smolka et al. | | |
| 2021/0165238 A1 | 6/2021 | Ventura et al. | | |
| 2022/0003958 A1* | 1/2022 | Jeong | .................... | G02B 7/02 |
| 2023/0004065 A1* | 1/2023 | Osada | .................... | G03B 5/06 |

FOREIGN PATENT DOCUMENTS

| | | | |
|---|---|---|---|
| JP | H06222413 A | | 8/1994 |
| JP | 2021-505951 A | | 2/2021 |
| WO | WO-2022045702 A1 | * | 3/2022 |

* cited by examiner

OPTICAL ELEMENT DRIVING DEVICE, CAMERA DEVICE, AND ELECTRONIC APPARATUS

CROSS-REFERENCE TO RELATED APPLICATIONS

This application claims the benefit of Chinese Patent Application No. 202111354743.5 filed Nov. 16, 2021, which is hereby incorporated by reference herein in its entirety.

TECHNICAL FIELD

The present disclosure relates to an optical element driving device, a camera device and an electronic apparatus used in electronic apparatus such as smartphones.

BACKGROUND

Some camera devices used in electronic apparatus such as smartphones use a liquid lens unit or the like as an optical element to control the direction of travel of light from a subject. For example, in the imaging system disclosed in Japanese Patent Application Laid-Open No. 2021-505951 (Patent Document 1), an optical element filled with liquid in a container having a transparent bottom portion and a transparent window opposite to the transparent bottom portion is used. In this imaging system, the optical element is deformed by tilting the transparent window around the first axis and tilting the transparent window around the second axis orthogonal to the first axis to control the traveling direction of light passing through the optical element.

SUMMARY

However, in the technique of Patent Document 1, the transparent window is tilted around the first axis by applying different forces from each other to both ends of the transparent window in the second axis direction of the transparent window, and the transparent window is tilted around the second axis by applying different forces from each other to both ends in the first axis direction of the transparent window. Hereby, the position of the first axis is shifted due to the balance of the forces applied to both ends of the transparent window in the second axis direction of the transparent window and the position of the second axis is shifted due to the balance of the forces applied to both ends of the transparent window in the first axis direction of the transparent window, and as a consequence, there was a problem that the accuracy of controlling the traveling direction of the passing light is deteriorated. In addition, the imaging system disclosed in Patent Document 1 require a complex control system for controlling the forces applied to both ends of the transparent window in the second axis direction of the transparent window and forces applied to both ends of the transparent window in the first axis direction, and as a consequence, there was a problem that it lacks reliability.

The present disclosure has been made in view of such problems, and the present disclosure aims to provide an optical element driving device, a camera device and an electronic apparatus. The optical element driving device, a camera device and an electronic apparatus can control with high accuracy in the traveling direction of the passing light of the optical element without performing complex control.

To achieve the above-described object, in accordance with a first aspect of the present disclosure, there is provided an optical element driving device including: a fixed portion; an optical element in which liquid is encapsulated between a first end surface and a second end surface opposite to each other and the first end surface is fixed to the fixed portion; a first movable portion supported by the fixed portion and rotatable around an axis of a first rotation shaft; and a second movable portion supported by the first movable portion, rotatable around an axis of a second rotation shaft orthogonal to the first rotation shaft, and fixing the second end surface.

In accordance with a second aspect of the present disclosure, there is provided a camera device including the optical element driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION OF THE DRAWINGS

Hereinafter, embodiments of the present disclosure are explained with reference to drawings.

Figure 1:
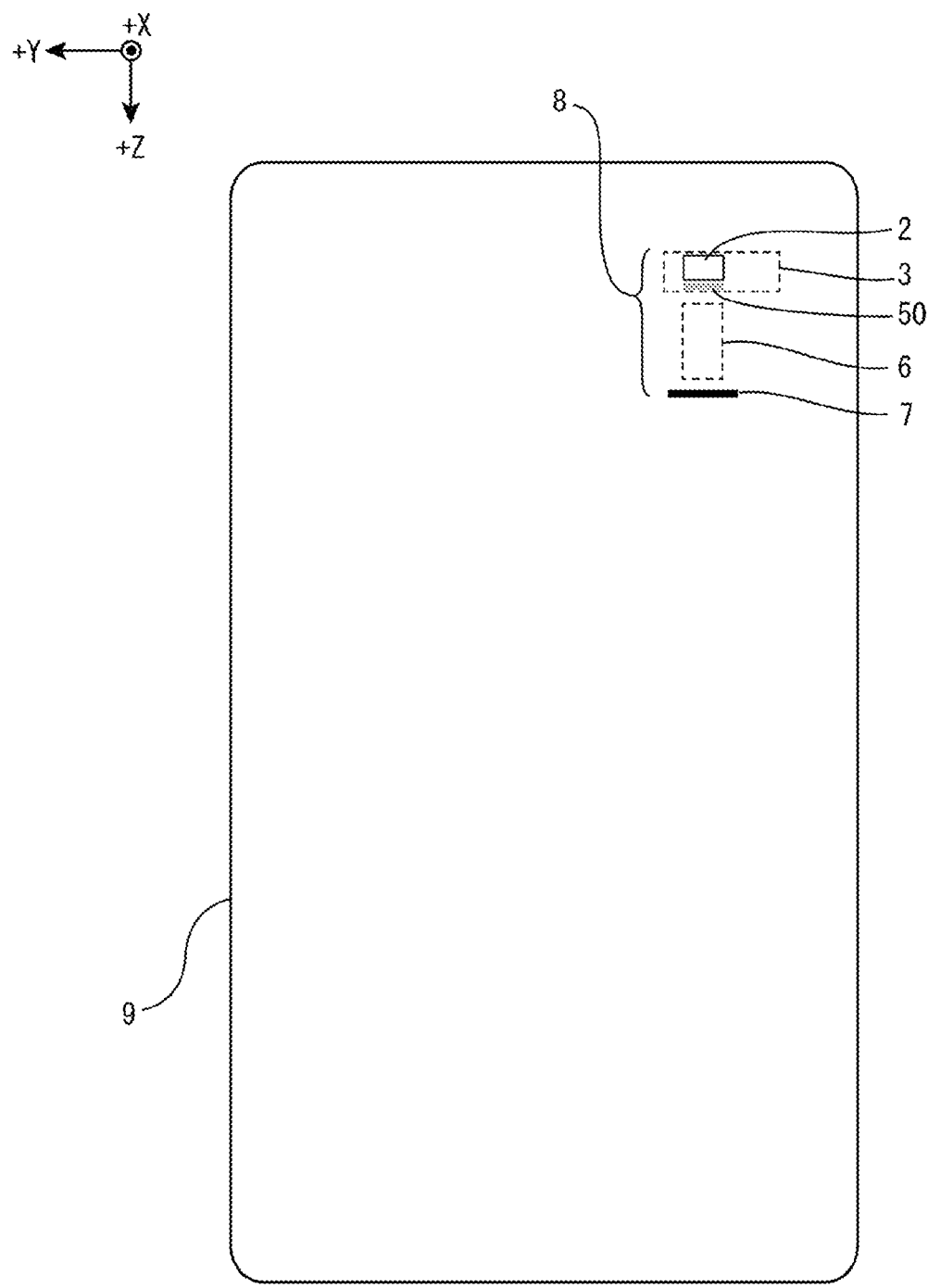
FIG. 1 is a front view of a smartphone 9 which is an electronic apparatus on which a camera device 8 including an optical element driving device 3 of one embodiment of the present disclosure is mounted.

As shown in FIG. 1, in the present embodiment, a camera device 8 is mounted on, for example, an electronic apparatus such as a smartphone 9. The camera device 8 includes: a prism 2 that bends incident light from a subject at a right angle; an optical element driving device 3 that supports a liquid lens unit 50 passing the passing light of the prism 2 and drives to change the inclination of the incident surface of the light; a lens body 6 that passes the passing light of the liquid lens unit 50; and an image sensor 7 that photoelectrically converts the passing light of the lens body 6.

Figure 2:
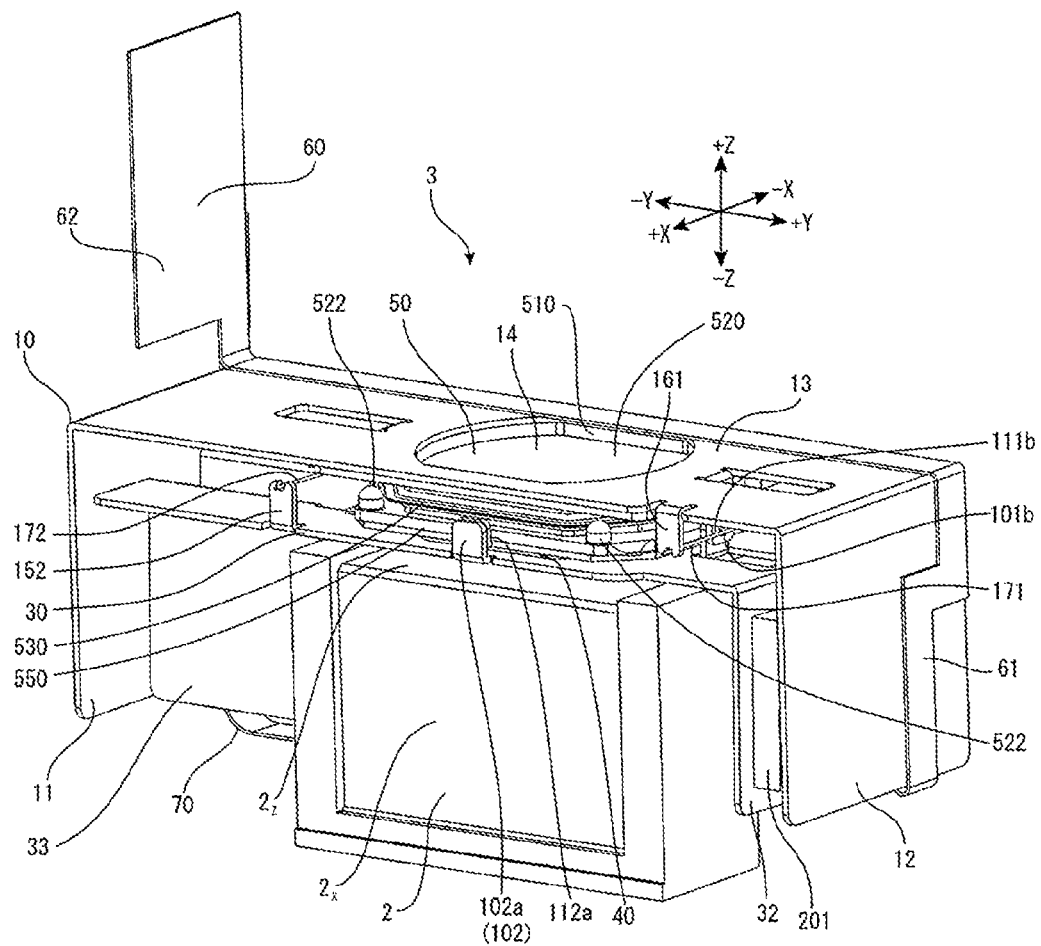
FIG. 2 is a perspective view of the optical element driving device 3 shown in FIG. 1.
Figure 3:
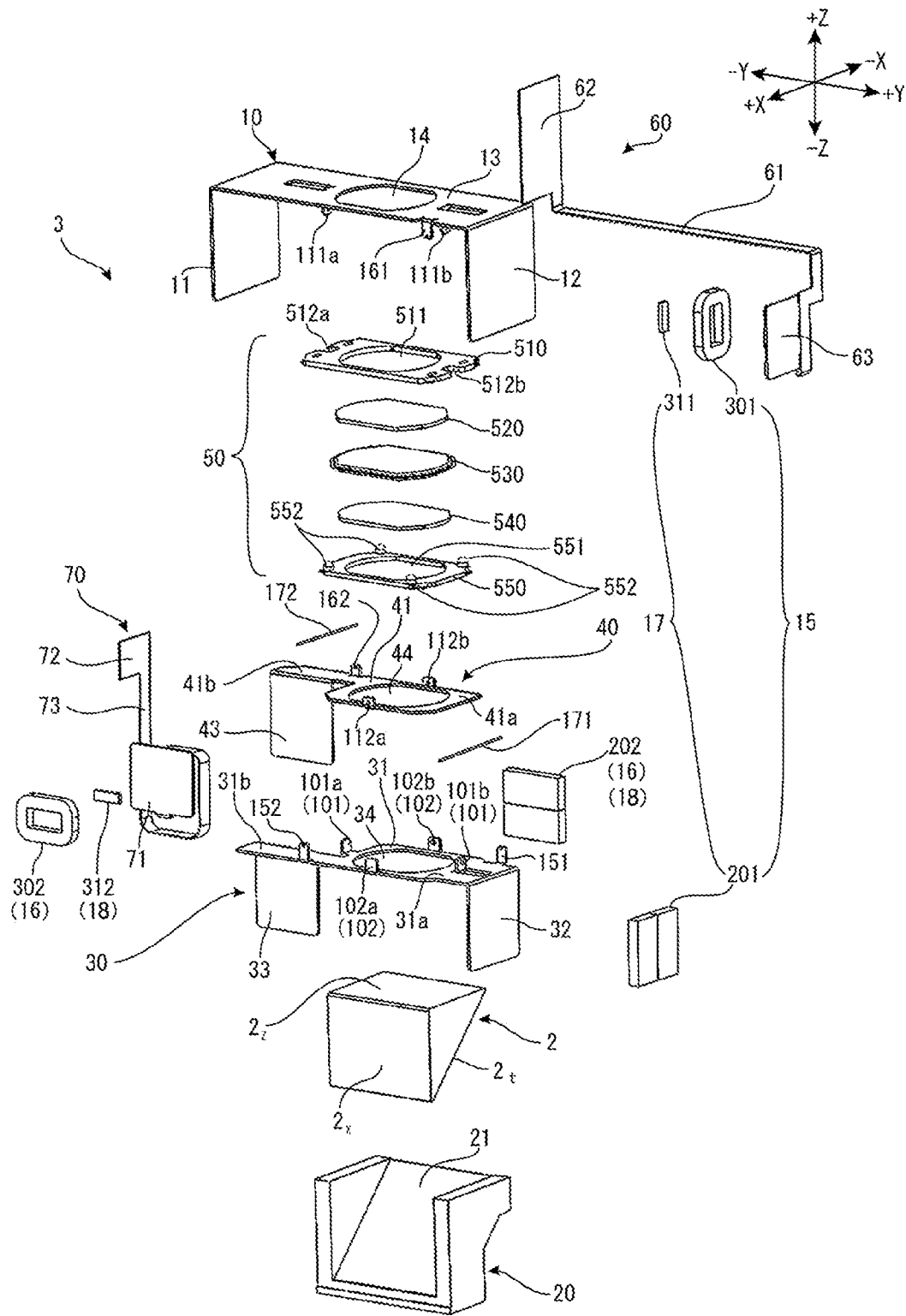
FIG. 3 is an exploded perspective view of the optical element driving device 3 shown in FIG. 2.
Figure 4:
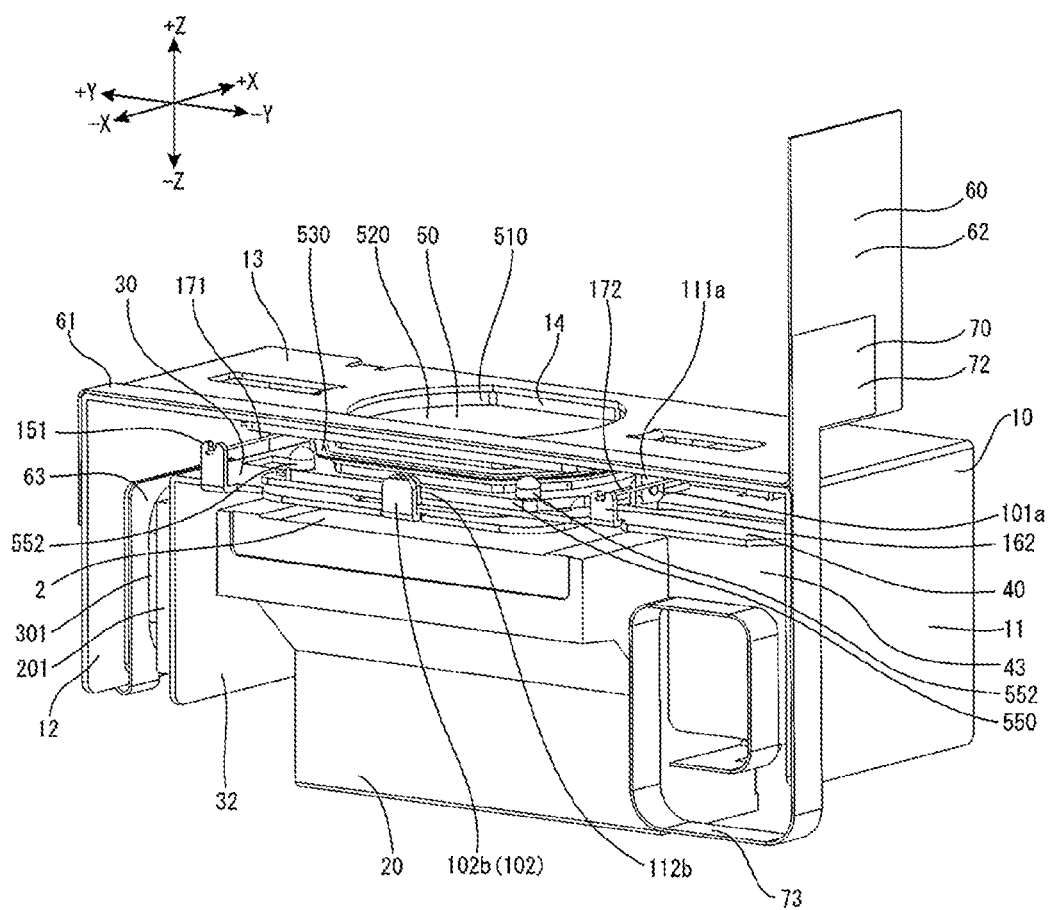
FIG. 4 is a perspective view of the optical element driving device 3 shown in FIG. 2 as viewed from another angle.

In the following, as shown in FIG. 2 to FIG. 4, a rectangular coordinate system consisting of an X axis, a Y axis and a Z axis orthogonal to each other is assumed, and the configuration of the present embodiment is explained. The Z axis is an axis passing through an optical axis of a lens body 6. Light from the subject is incident on the prism 2 from the X axis direction, is bent at a right angle by the prism 2, advances in the Z axis direction and passes through the liquid lens unit 50 and lens body 6. Hereinafter, in the Z axis direction, a side where the prism 2 is located when viewed from the lens body 6 is referred to as a −Z side, and a side where the image sensor 7 on the opposite side is located is referred to as a +Z side. In addition, in the X axis direction, a side of the subject when viewed from the prism 2 is referred to as a +X side, and its opposite side is referred to as a −X side.

As shown in FIG. 2 to FIG. 4, the optical element driving device 3 has an approximate configuration as follows. The optical element driving device 3 includes a fixed portion comprising a case 10, a liquid lens unit 50 as an optical element, a first movable portion 30, and a second movable portion 40. In the liquid lens unit 50, liquid is encapsulated between a first end surface (a first glass 520) and a second end surface (a second glass 540) opposite to each other, and the first end surface is fixed to the fixed portion. The first movable portion 30 is supported by the fixed portion so as to be rotatable around the axis of the first rotation shaft 101. The second movable portion 40 is supported by the first movable portion 30 so as to be rotatable around the axis of the second rotation shaft 102, and further fixes the second end surface of the liquid lens unit 50.

Further, as shown in FIG. 3, the optical element driving device 3 has a first driving portion 15 and a second driving portion 16, a first detecting portion 17 and a second detecting portion 18, and a first wire spring 171 and a second wire spring 172. The first wire spring 171 returns the first movable portion 30 to its point of origin and the second wire spring 172 returns the second movable portion 40 to its point of origin.

Before explaining the configuration of the optical element driving device 3, the prism 2 and a mount portion 20 are explained. The mount portion 20 is a member that supports the prism 2. As shown in FIG. 3, the prism 2 has a cross-sectional shape of a right-angled isosceles triangle surrounded by an incidence surface 2x and an emission surface 2z orthogonal to each other and a reflection surface 2t connecting the incidence surface 2x and the emission surface 2z. The mount portion 20 has a placing portion 21 with an inclined portion and two side wall portions, and supports the reflection surface 2t of the prism 2 by the placing portion 21. The mount portion 20 supporting the prism 2 is accommodated in the case 10 of the optical element driving device 3 and is fixed to the main body portion of the camera device 8. Light from the subject is incident from the +X side on the incidence surface 2x of the prism 2 supported by the mount portion 20. This light is bent at a right angle by the reflection surface 2t of the prism 2 and is emitted from the emission surface 2z to the +Z side. The emitted light from the prism 2 passes through a liquid lens unit 50 and a through hole 14 of the case 10 to be described later and is directed to the lens body 6 and image sensor 7 shown in FIG. 1.

Next, the configuration of the optical element driving device 3 is explained in detail. In the optical element driving device 3, the case 10, which is a fixed portion, is formed by bending a plate-like member, and has a main body portion 13 and two approximately rectangular side plate portions 11 and 12 extending in the −Z axis direction from both ends in the Y axis direction of the main body portion 13. The through hole 14 is provided in the center of the main body portion 13. Both sides in the Y axis direction adjacent to the through hole 14 are notched and bent to the −Z axis side to form upright portions, and the respective upright portions are provided with through holes as bearings 111a, 111b. The bearings 111a and 111b are aligned across the through hole 14 in the Y axis direction. Further, at an edge on the +X side of the main body portion 13, a portion of the +Y side portion thereof is bent to the −Z axis direction to form an upright portion, and the upright portion is provided with a wire support portion 161. The optical element driving device 3 is fixed to the main body portion of the camera device 8 by the side plate portions 11 and 12 of the case 10. In the present embodiment, a portion which is substantially fixed to the main body portion of the camera device 8 and does not move is treated as a fixed portion.

As shown in FIG. 3, the first movable portion 30, the second movable portion 40 and the liquid lens unit 50 are arranged between the mount portion 20 and the main body portion 13 of the case 10.

The first movable portion 30 is formed by bending a plate-like member and has a flat plate portion 31. This flat plate portion 31 has a main body portion 31a provided with a through hole 34 that passes emitted light from the emission surface 2z of the prism 2, and an extension portion 31b extending from the +X side portion of an edge on the −Y side of the main body portion 31a to the −Y axis direction. A side plate portion 32 extends in the −Z axis direction from an edge on the +Y side of the main body portion 31a. A first magnet 201 is fixed to the surface on the +Y side of the side plate portion 32. The first magnet 201 is magnetized in the Y axis direction and the magnetization directions of the +X side portion and the −X side portion are opposite. Further, a side plate portion 33 extends in the −Z axis direction from an edge on the −X side of the extension portion 31b. A second magnet 202 is fixed to the surface on the −X side of the side plate portion 33. The second magnet 202 is magnetized in the X axis direction and the magnetization directions of the +Z side portion and the −Z side portion are opposite.

The main body portion 31a of the first movable portion 30 has an upright portion protruding in the +Z axis direction and formed with first rotation shafts 101a and 101b constituting the first rotating shaft 101. The upright portion formed with the first rotation shaft 101a is formed by bending a portion of an edge of the main body portion 31a on the −Y side to the +Z side. The first rotation shaft 101a is formed as a cylinder protruding from the surface on the −Y side of the upright portion. The upright portion formed with the first rotation shaft 101b is formed by notching and bending the main body portion 31a to the +Z side. The first rotation shaft 101b is formed as a cylinder protruding from the surface on the +Y side of the upright portion. The first rotation shafts 101a and 101b and the bearings 111a and 111b in the main body portion 13 of the case 10 are aligned across the through hole 34 in the Y axis direction. The first rotation shafts 101a and 101b are inserted into the bearings 111a and 111b of the case 10 and rotatably supported. Therefore, the first movable portion 30 is rotatable around the axes of the first rotation shafts 101a and 101b parallel to the Y axis direction with respect to the case 10 which is the fixed portion. The axis of rotation formed by the first rotation shaft 101a and the first rotation shaft 101b is the axis of the first rotation shaft 101.

In the main body portion 31a of the first movable portion 30, an upright portion provided with a wire support portion 151 is formed by bending in the vicinity of the +Y side end portion of the edge on the −X side. Further, in the extension portion 31b of the first movable portion 30, an upright portion provided with a wire support portion 152 is formed by bending at the edge on the −X side. The first wire spring 171 is supported at one end by the wire support portion 151 of the first movable portion 30, and is supported at the other end by the wire support portion 161 of the case 10. The first wire spring 171 generates drag force against the rotation driving force around the axis of the first rotation shaft 101 generated in the first movable portion 30.

The second movable portion 40 is formed by bending a plate-like member and has a flat plate portion 41. The flat plate portion 41 has a main body portion 41a provided with a through hole 44 that passes emitted light from the emission surface 2z of the prism 2, and an extension portion 41b extending from an edge on the −Y side of the main body portion 41a. A side plate portion 43 extends in the −Z axis direction from an edge on the +X side of the extension portion 41b.

Upright portions formed with through holes as bearings 112a and 112b are bent and protrude in the +Z axis direction from edges on the ±X sides of the main body portion 41a of the second movable portion 40. The bearings 112a and 112b are aligned across the through hole 44 in the X axis direction. Further, the second rotation shafts 102a and 102b constituting the second rotating shaft 102 of the first movable portion 30 are also aligned across the through hole 34 in the X axis direction. The second movable portion 40 is arranged on the +Z side of the first movable portion 30 with the side plate portion 43 adjacent to the −X side portion of the side plate portion 33. The second rotation shafts 102a and 102b of the first movable portion 30 are inserted into the bearings 112a and 112b of the second movable portion 40 and rotatably supported. Therefore, the second movable portion 40 is rotatable around the axes of the second rotation shafts 102a and 102b of the first movable portion 30 parallel to the X axis direction with respect to the first movable portion 30. The axis of rotation formed by the second rotation shaft 102a and 102b is the axis of the second rotation shaft 102.

Further, in the extension portion 41b of the second movable portion 40, an upright portion provided with a wire support portion 162 is formed by bending at the edge on the −X side. The second wire spring 172 is supported at one end by the wire support portion 152 of the first movable portion 30, and is supported at the other end by the wire support portion 162 of the second movable portion 40. The second wire spring 172 generates drag force against the rotation driving force around the axis of the second rotation shaft 102 generated in the second movable portion 40.

Thus, in the present embodiment, the fixed portion comprising the case 10, the first movable portion 30, and the second movable portion 40 supported by the first movable portion 30 constitute a gimbal mechanism rotating the first movable portion 30 around the axis of the first rotation shaft (101) parallel to the Y axis direction and rotating the second movable portion 40 around the axis of the second rotation shaft (102) parallel to the X axis direction.

The liquid lens unit 50 is an optical element formed by arranging a first plate 510, a first glass 520, a liquid lens 530, a second glass 540 and a second plate 550 in the −Z axis direction. The first plate 510 and the second plate 550 are provided with through holes 511 and 551 that pass the emitted light from the emission surface 2z of the prism 2, respectively. Further, notch portions 512a and 512b are provided at the edges on both sides in the Y axis direction of the first plate 510 to pass through the upright portions provided with the bearings 111a and 111b of the case 10. The upright portions provided with the bearings 111a and 111b reach the positions of the upright portions provided with the first rotation shafts 101a and 101b of the first movable portion 30 via the notch portions 512a and 512b.

The liquid lens 530 is formed by filling a transparent flexible container with liquid. The first plate 510 is fixed to the surface on the −Z side of the main body portion 13 of the case 10. The second plate 550 is fixed to the surface on the +Z side of the main body portion 41a of the second movable portion 40. The first glass 520 is fixed to the first plate 510 and the liquid lens 530 and maintains the flatness the surface of the liquid lens 530 on the +Z side. The second glass 540 is fixed to the second plate 550 and the liquid lens 530 and maintains the flatness of the surface of the liquid lens 530 on the −Z side. Further, stoppers 552 protruding to the +Z side are provided at four corners of the second plate 550. Therefore, when the second movable portion 40 is inclined around the axis of the first rotation shaft 101 and/or around the axis of the second rotation shaft 102, the second plate 550 is also inclined according to the inclination of the second movable portion 40, and according to the inclination of the second plate 550, the surface on the −Z side of the liquid lens 530 is inclined while remaining flat. In the liquid lens unit 50 according to the present embodiment, the first glass 520 serves as a first end surface supported by the fixed portion and the second glass 540 serves as a second end surface supported by the second movable portion 40. Thereby, the emitted light of the prism 2 advances in a direction inclined to the optical axis of the lens body 6, so that the position of incidence on the image sensor 7 is changed. Conversely, when the direction of the light incident on the camera device 8 is changed due to hand shake or the like, the position of incidence on the image sensor 7 can be maintained constant.

It is desirable that the centers of the through holes 14, 34, 44, 511, and 551 coincide when viewed from the Z axis direction, and the center of the through hole 511 is the center of the first end surface, i.e. the center of the first glass 520, and the first end surface is orthogonal to the Z axis. In addition, when viewed form the Z axis direction, it is desirable that the first rotation shaft 101 and the second rotation shaft 102 pass through the center of the through hole 511. In addition, when viewed from a direction orthogonal to the Z axis, it is desirable that the first rotation shaft 101 and the second rotation shaft 102 overlap with the second end surface, i.e. the center of the second glass 540, that is, are at the same height. In addition, when viewed form the Z axis direction, when the first wire spring 171 is support on the axis line of the first rotation shaft 101 of the first movable portion 30, there is no change in height, so that the wire support portion 151 is provided at a place that is not on the axis line of the first rotation shaft 101. Similarly, when viewed from the Z axis direction, when the second wire spring 172 is supported on the axis line of the second rotation shaft 102 of the second movable portion 40, there is no changed in height, so that the wire support portion 162 is provided at a place that is not on the axis line of the second rotation shaft 102.

As shown in FIG. 3, the FPC (Flexible Printed Circuit board) 60 has a strip-like portion 61 extending in the Y axis direction and a side surface portion 62 bent and projecting in the +Z axis direction from the −Y side end portion of the strip-like portion 61. A +Y side end portion of the strip-like portion 61 is bent and projects in the −Z axis direction, and is further folded back to the −Y axis direction, and a side surface portion 63 is provided at the end portion. A first coil 301 long in the Z axis direction is disposed on the surface on the −Y side of the side surface portion 63. An electric current flows in the first coil 301 via the strip-like portion 61. Further, a Hall element 311, which is the first magnetic sensor, is disposed inside the winding of the first coil 301 on the surface of the −Y side of the side surface portion 63. In the FPC 60, the side surface portion 63 is fixed on the −Y side (inside) portion of the side plate portion 12 of the case 10, and the strip-like portion 61 is fixed along the edge on the −X side of the outside of the side plate portion 12 and main body portion 13. The first coil 301 and the Hall element 311 disposed at the side surface portion 63 of the FPC 60 are opposed to the first magnet 201 disposed at the side plate portion 32 of the first movable portion 30. The first magnet 201 and the first coil 301 constitute the first driving portion 15 rotationally driving the first movable portion 30 around the axis of the first rotation shaft 101 with respect to the case 10 which is the fixed portion. Further, the first magnet 201 and the Hall element 311 which is the first magnetic sensor constitute the first detecting portion 17 detecting the rotation displacement of the first movable portion 30 around the axis of the first rotation shaft 101. The side surface portion 62 is electrically connected to the main body of the camera device 8.

As shown in FIG. 3, the FPC (Flexible Printed Circuit board) 70 has a side surface portion 71 orthogonal to the X axis direction, a side surface portion 72 fixed to the side surface portion 62 of the FPC 60, and a strip-like portion 73 connecting the side surface portion 71 and the side surface portion 72. A second coil 302 long in the Y axis direction is disposed on the surface on the +X side of the side surface portion 71. An electric current flows in the second coil 302 via the strip-like portion 73. Further, a Hall element 312, which is the second magnetic sensor, is disposed inside the winding of the second coil 302 on the surface on the +X side of the side surface portion 71. In the FPC 70, the side surface portion 71 is fixed to the surface on the +X side of the side plate portion 43 of the second movable portion 40. The second coil 302 and Hall element 312 disposed at the side surface portion 71 of the FPC 70 are opposed to the second magnet 202 disposed on the surface on the −X side of the side plate portion 33 of the first movable portion 30. The second magnet 202 and the second coil 302 constitute the second driving portion 16 rotationally driving the second movable portion 40 around the axis of the second rotation shaft 102 with respect to the first movable portion 30.

Further, the second magnet 202 and the Hall element 312 which is the second magnetic sensor constitute the second detecting portion 18 detecting the rotation displacement of the second movable portion 40 around the axis of the second rotation shaft 102.

As shown in FIG. 4, the strip-like portion 73 first extends from the side surface portion 72 in the −Z axis direction, thereafter is curved to change the orientation to the +Y axis direction, and end portion of the strip-like portion 73 enters inside the case 10 from the outside. Then, a portion of the strip-like portion 73 which enters inside the case 10 and opposes to the −X axis side portion of the side plate portion 43 extends in the +Y axis direction, thereafter, bends and extends in the +Z axis direction, then an end portion in the direction of travel bends and extends in the −Y axis direction, bends and extends in the −Z axis direction, then bends and extends in the +Y axis direction.

Finally, an end portion in the direction of travel is changed in orientation to the +X axis direction, reaches the +X axis side portion of the side plate portion 43, and is connected to the side surface portion 71. Thus, the strip-like portion 73 is provided in a swirl shape, and thereby, the second movable portion 40 can rotate without being affected by the tension of the FPC 70.

In the present embodiment, when inclining the second glass 540 which is the second end surface of the liquid lens unit 50 which is the optical element around the axis of the first rotation shaft 101 and/or around the axis of the second rotation shaft 102, a predetermined electric current is applied to the first coil 301 and/or the second coil 302. The predetermined electric current is an electric current having a polarity corresponding to a desired inclination direction around the axis of the first rotation shaft 101 and a magnitude corresponding to a desired inclination angle, and/or an electric current having a polarity corresponding to a desired inclination direction around the axis of the second rotation shaft 102 and a magnitude corresponding a desired inclination angle. The electric current is supplied to the first coil 301 via the FPC 60 and is supplied to the second coil 302 via the FPC 70. As a result, the first movable portion 30 is driven by the electromagnetic force in the X axis direction acting between the first magnet 201 and the first coil 301, and rotates around the axis of the first rotation shaft 101. Further, the second movable portion 40 is driven by the electromagnetic force in the Z axis direction acting between the second magnet 202 and the second coil 302, and rotates around the axis of the second rotation shaft 102. Thereby, the second movable portion 40 is inclined with respect to the case 10 which is the fixed portion, and the second glass 540 which is the second end surface of the liquid lens unit 50 is inclined according to the inclination of the second movable portion 40. The Hall element 311 detects the rotation displacement of the first movable portion 30 around the axis of the first rotation shaft 101 based on the magnetic field received from the first magnet 201, and the Hall element 312 detects the rotation displacement of the second movable portion 40 around the axis of the second rotation shaft 102 based on the magnetic field received from the second magnet 202. The electric current flowing in the first coil 301 and/or the second coil 302 is adjusted based on the detected value of the rotation displacement.

The above are the details of the configuration of the embodiment of the present disclosure. The optical element driving device 3 according to the present embodiment includes: a case 10 which is a fixed portion; a liquid lens unit 50 which is an optical element in which liquid is encapsulated between a first end surface and a second end surface opposite to each other and the first end surface is fixed to the case 10; a first movable portion 30 supported by the case 10 and rotatable around an axis of the first rotation shaft 101; and a second movable portion 40 supported by the first movable portion 30, rotatable around an axis of a second rotation shaft 102 orthogonal to the first rotation shaft 101, and fixing the second end surface. Therefore, since the positions of the first rotation shaft 101 and the second rotation shaft 102 do not shift, even if complicated control is no performed, the accuracy of controlling the inclination around the axis of the first rotation shaft 101 and the inclination around the axis of the second rotation shaft 102 for the second end surface of the liquid lens unit 50 can be improved. That is, the accuracy of controlling the traveling direction of transmitted light of the liquid lens unit 50 is high.

It is to be noted that, the first driving portion 15 only needs to be arranged so that the driving force acts in the tangential direction of the circle centered on the first rotation shaft 101. Further, the second driving portion 16 only needs to be arranged so that the driving force acts in the tangential direction of the circle centered on the second rotation shaft 102.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical element driving device, comprising:
   a fixed portion having a main body portion provided with a pair of bearings aligned across a through hole;
   an optical element in which liquid is encapsulated between a first end surface and a second end surface opposite to each other and the first end surface is fixed to the fixed portion;

a first movable portion having a main body portion provided with a through hole corresponding to the through hole of the fixed portion and a pair of first rotation shafts aligned across the through hole, and a pair of second rotation shafts arranged to orthogonal to the pair of first rotation shafts, wherein the first movable portion is rotatable supported by the pair of bearings of the fixed portion and rotatable around an axis of the first rotation shaft; and a second movable portion having a main body portion provided with a through hole corresponding to the through hole of the first movable portion and a pair of bearings supporting rotatable the pair of second rotation shafts of the first movable portion, and fixing the second end surface of the optical element by the main body portion;

a first driving portion having a first magnet fixed to a first side plate portion connected to the main body portion of the first movable portion and a first coil arranged at a first FPC (Flexible Printed Circuit board) fixed to the fixed portion, the first coil arranged opposite the first magnet, the first driving portion rotationally driving the first movable portion around the axis of the first rotation shaft; and a second driving portion having a second magnet fixed to a second side plate portion connected to the main body portion of the first movable portion, the second side plate portion arranged to orthogonal to the first side plate portion and a second coil arranged at one end of a second FPC (Flexible Printed Circuit board) having the one end fixed to the second movable portion and the other end fixed to the first FPC, the second coil arranged opposite the second magnet, the second FPC provided with a strip-like portion in a swirl shape, the second driving portion rotationally driving the second movable portion around the axis of the second rotation shaft.

2. The optical element driving device according to claim 1, comprising:

a first detecting portion fixed to the fixed portion and detecting rotation displacement of the first movable portion around the axis of the first rotation shaft by detecting a magnetic field generated by the first magnet; and a second detecting portion fixed to the second movable portion and detecting rotation displacement of the second movable portion around the axis of the second rotation shaft by detecting a magnetic field generated by the second magnet.

3. The optical element driving device according to claim 2, wherein when the second end surface of the optical element is inclined around the axis of the first rotation shaft and/or around the axis of the second rotation shaft, an adjusted electric current based on the rotation displacement detected from the first detecting portion and the second detecting portion is applied to the first coil and/or the second coil through the first FPC and the second FPC.

4. The optical element driving device according to claim 1, comprising:

a first wire spring connected between the fixed portion and the first movable portion; and a second wire spring connected between the first movable portion and the second movable portion, and wherein a wire support portion of the first wire spring is provided at a place away from an axis line of the first rotation shaft of the first movable portion and a wire support portion of the second wire spring is provided at a place away from an axis line of the second rotation shaft of the second movable portion, wherein the first wire spring generates drag against the rotation driving force around the axis of the first rotation shaft of the first movable portion to return the first movable portion to its point of origin and the second wire spring generates drag against the rotation driving force around the axis of the second rotation shaft of the second movable portion to return the second movable portion to its point of origin.

5. The optical element driving device according to claim 1, wherein the first rotation shaft and the second rotation shaft pass through a center of the first end surface and are orthogonal to an axis perpendicular to the first end surface.

6. The optical element driving device according to claim 1, wherein the first rotation shaft and the second rotation shaft are at the same height as the second end surface.

7. A camera device comprising the optical element driving device according to claim 1.

8. An electronic apparatus comprising the camera device according to claim 7.

9. The optical element driving device according to claim 1, wherein a center position of the through hole of the main body portion of the fixed portion, a center position of the through hole of the first movable portion and a center position of the through hole of the second movable portion coincide with each other.

10. The optical element driving device according to claim 1, wherein the optical element is a liquid lens unit formed by arranging a first plate, a first glass, a liquid lens, a second glass and a second plate in the optical axis direction of the liquid lens.

11. The optical element driving device according to claim 1, wherein the fixed portion, the first movable portion, and the second movable portion supported by the first movable portion constitute a gimbal mechanism rotating the first movable portion around the axis of the first rotation shaft and rotating the second movable portion around the axis of the second rotation shaft.

12. The optical element driving device according to claim 1, wherein the second FPC provided with a strip-like portion in a swirl shape connects a side surface portion fixed to a side surface portion of the first FPC to a side surface portion which the second coil is arranged.

* * * * *